No. 790,808. PATENTED MAY 23, 1905.
J. E. SHAW.
AIR BRAKE SYSTEM.
APPLICATION FILED JUNE 21, 1904.
2 SHEETS—SHEET 1.
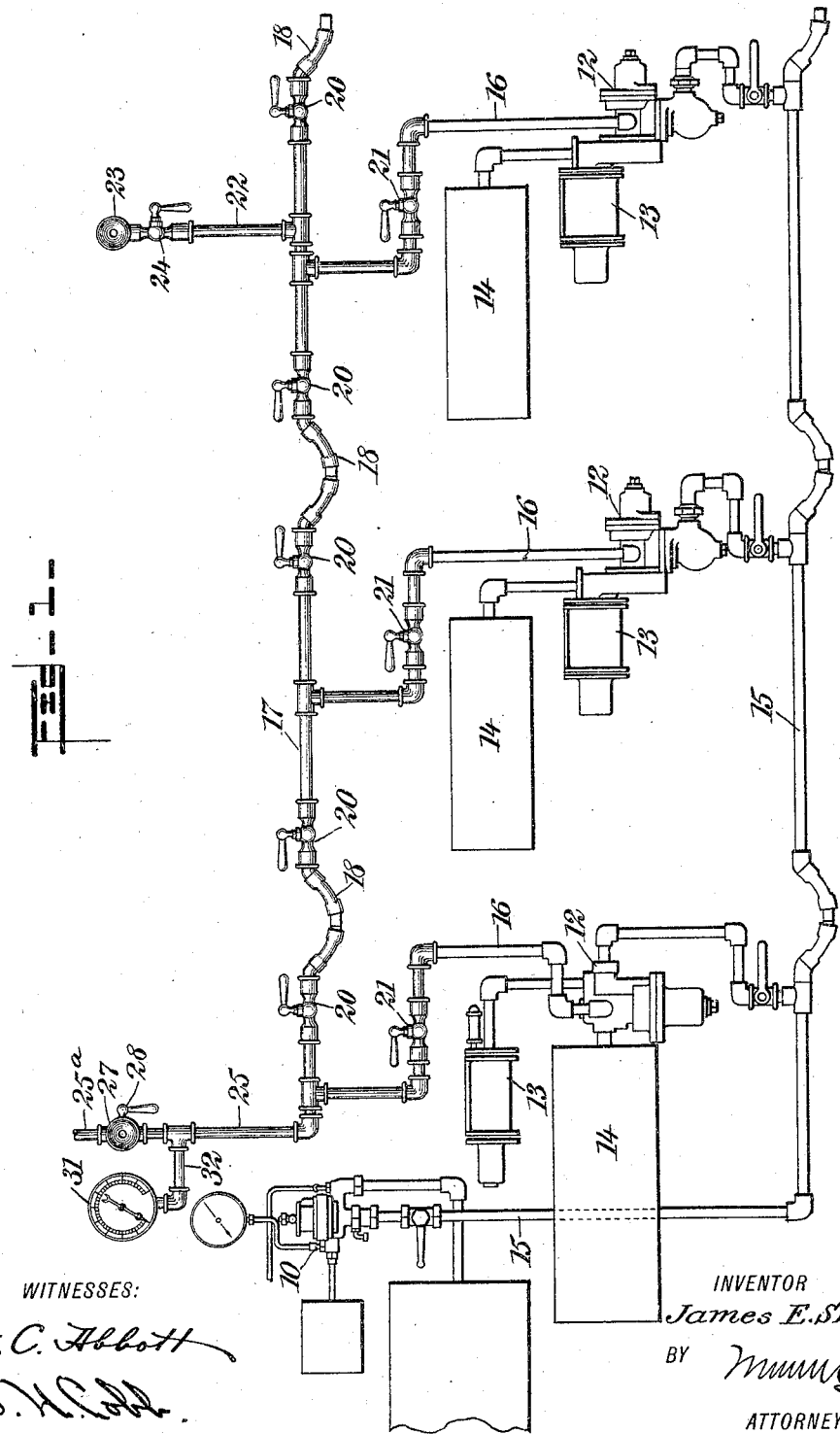
WITNESSES:
N. C. Abbott
S. H. Cobb
INVENTOR
James E. Shaw
BY
ATTORNEYS

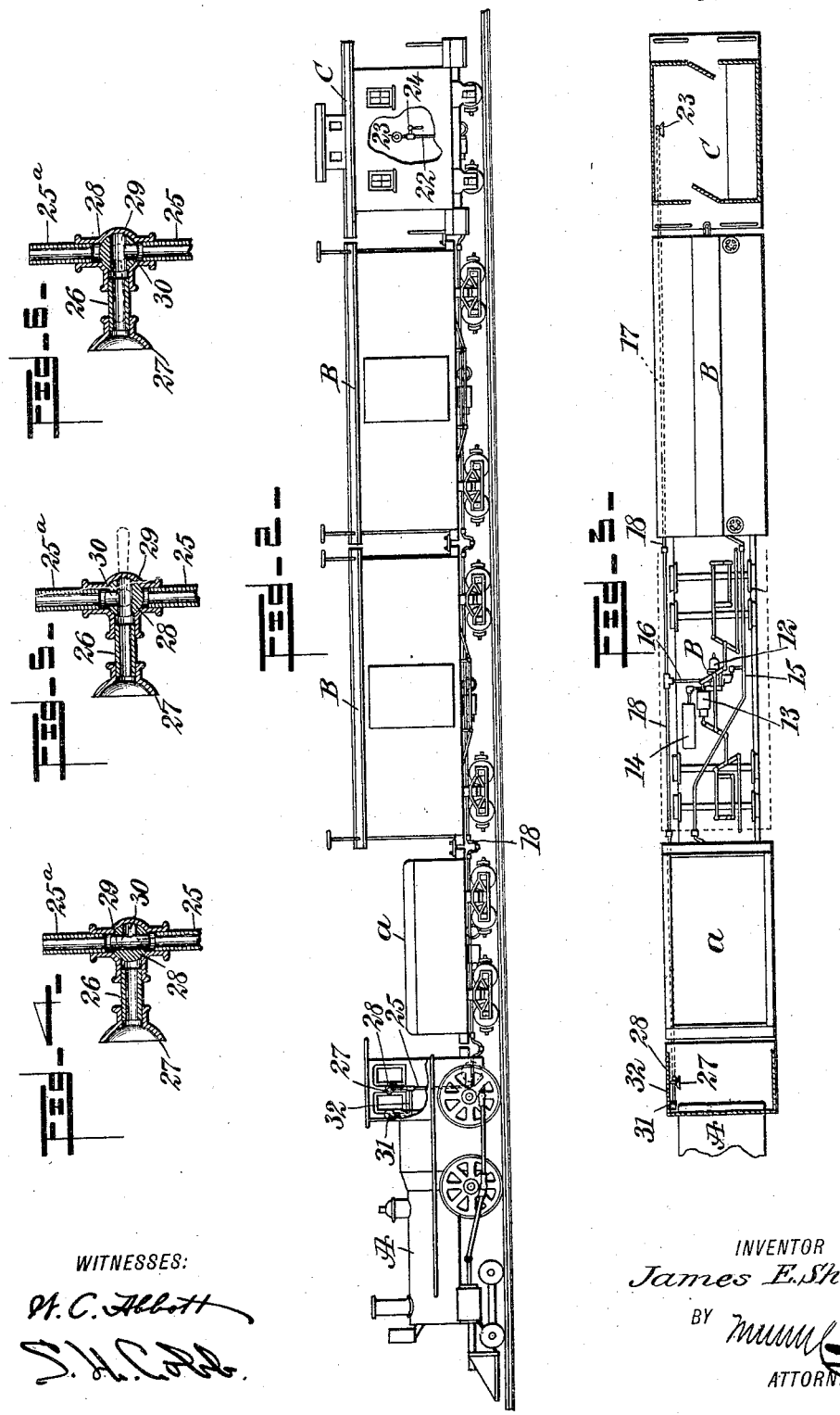

No. 790,808.

Patented May 23, 1905.

UNITED STATES PATENT OFFICE.

JAMES ELVIS SHAW, OF COUNCIL GROVE, KANSAS.

AIR-BRAKE SYSTEM.

SPECIFICATION forming part of Letters Patent No. 790,808, dated May 23, 1905.

Application filed June 21, 1904. Serial No. 213,452.

*To all whom it may concern:*

Be it known that I, JAMES ELVIS SHAW, a citizen of the United States, and a resident of Council Grove, in the county of Morris and State of Kansas, have invented a new and Improved Air-Brake System, of which the following is a full, clear, and exact description.

My invention relates to air-brake systems, and has for its principal object the provision of means for giving the engineer positive control of the exhaust from the brake-cylinders.

With this and other ends in view the invention consists in the various features and combinations hereinafter described, and more particularly claimed.

Reference is to be had to the accompanying drawings, forming a part of this specification, in which similar characters of reference indicate corresponding parts in all the figures.

Figure 1 is a diagrammatic view of a brake system including one embodiment of my invention. Fig. 2 shows in side elevation a train to which the system is applied. Fig. 3 is a partial top plan view thereof, parts being broken away and in section; and Figs. 4, 5, and 6 are sectional details of the three-way valve in various operating positions.

A designates a locomotive, to which is coupled a tender $a$, cars B B, (here shown as those used for freight,) and a caboose C. The train is provided with an air-brake system, of which there is here illustrated an engineer's brake-valve 10 and triple valves 12, with each of which are associated a brake-cylinder 13 and an auxiliary reservoir 14. The cylinders are connected through the triple valves with the engineer's valve by a train-pipe 15 in the usual manner. Each brake-cylinder may exhaust, as is customary, through the triple valve, and connected to each exhaust-opening is a branch pipe or conduit 16, leading to a main pipe or conduit 17, running the length of the train. The sections of this main pipe may be joined between the cars and locomotive by flexible hose 18, in which are suitable couplings. At each side of these flexible connectors may be situated cocks or valves 20 for closing the pipe when the cars are disconnected. A similar cock or valve 21 may be inserted in each branch pipe to enable the brake-cylinder of any car to be cut out in use.

In the caboose, and preferably in each coach of a passenger-train, is a branch 22 from the pipe 17, which terminates in a flaring outlet or bell 23 and has in it a cock or valve 24. At the cab of the locomotive the main pipe ends in a pipe 25, having an outlet at any suitable point into the atmosphere, as is indicated at 25$^a$, and a second outlet through a lateral branch 26, which terminates in a bell 27, similar to that previously described. For controlling these two outlets a three-way cock or valve 28 is provided, having a transverse passage 29 and a passage 30 connecting therewith.

A gage 31 may be connected to the main pipe at any desired point by a branch pipe 32 and serves to indicate the pressure therein.

When the three-way valve is in the position indicated in Fig. 4 of the drawings, the exhaust of each of the brake-cylinders will be connected to the outer air without obstruction, as would be the case in the ordinary air-brake system in the absence of the common pressure-retaining valves. This allows the brakes to be operated under ordinary conditions without departure from the usual practice. Now if the train is running upon a downgrade with the brakes partly set and it becomes necessary that a full application be made or if they "leak off" from their applied position the engineer can set the brakes and then by turning the valve 28 to the position indicated in Fig. 5 may move the brake-valve to running position and recharge the train-line and the auxiliary reservoirs, while the brakes will be held by this closure of their exhaust. Then while in this condition by manipulation of the valve 28 the engineer can at will maintain the full brake power irrespective of the position of the brake-valve, or can partly or fully release the brakes as he desires, and this having been done can reset them to full application without further release. As a consequence it will be seen that complete control of the train can be retained even upon grades while recharging, obviating the danger of accidents which arises from the insufficiency of the ten or fifteen pounds pressure kept in the system by the ordinary type of retaining-valve.

When the brakes are not in use and the valve 28 is in the position illustrated in Fig. 6, the bell 27 is placed in communication with the pipe 17, and upon the valve 24 being opened the bell 23 will also be connected with the pipe and the whole constitute a speaking-tube between the locomotive and the remainder of the train, enabling the engineer to converse with the conductor or other hands. To call attention to the desire to so communicate the engineer may signal by his whistle and the conductor by the train air-signal.

It should be noted that the regulation by the engineer of the exhaust and the establishing of communication between the locomotive-cab and the train is secured without in any way impairing the efficiency of the brake systems as they are used at present. On the contrary, they are made more effective by the maintenance of control of the brakes under all conditions, as has been above pointed out.

Having thus described my invention, I claim as new and desire to secure by Letters Patent—

1. An air-brake system comprising a brake-cylinder, and a conduit leading from the exhaust of the brake-cylinder and having a plurality of flaring outlets whereby said conduit may be utilized as a speaking-tube between different portions of the system.

2. An air-brake system comprising a brake-cylinder, a conduit leading from the exhaust of the brake-cylinder and having a plurality of flaring outlets whereby said conduit may be utilized as a speaking-tube between different portions of the systems, and valves in the conduit for controlling the outlets.

3. An air-brake system comprising a brake-cylinder, a conduit leading from the exhaust of the brake-cylinder and having two outlets, and furnishing an uninterrupted passage from the exhaust to the atmosphere and means for closing either outlet.

4. An air-brake system comprising a brake-cylinder, a conduit leading from the exhaust of the brake-cylinder and having two outlets, and furnishing an uninterrupted passage from the exhaust to the atmosphere and a three-way valve for controlling one of the outlets.

5. An air-brake system comprising a plurality of brake-cylinders, a train-pipe connecting the cylinders, a second pipe also connecting the brake-cylinders and extending beyond the same, said extensions having flaring outlets, and valves in the extensions.

6. The combination with a locomotive and a car, of an air-brake system comprising a speaking-tube which may be maintained at atmospheric pressure in use.

7. The combination with a locomotive and a car, of an air-brake system comprising a brake-cylinder, and a pipe connecting the exhaust of the brake-cylinder with the locomotive and having flaring outlets.

8. The combination with a locomotive and a car, of an air-brake system comprising a brake-cylinder, a pipe connecting the exhaust of the brake-cylinder with the locomotive and having two outlets at the locomotive, and furnishing an uninterrupted passage from the exhaust to the atmosphere and a three-way valve for controlling the outlets.

In testimony whereof I have signed my name to this specification in the presence of two subscribing witnesses.

JAMES ELVIS SHAW.

Witnesses:
E. D. SCOTT,
A. MOSER, Jr.